(12) United States Patent
Wang et al.

(10) Patent No.: US 9,123,362 B1
(45) Date of Patent: Sep. 1, 2015

(54) METHODS FOR ASSEMBLING AN ELECTRICALLY ASSISTED MAGNETIC RECORDING (EAMR) HEAD

(71) Applicant: Western Digital (Fremont), LLC, Fremont, CA (US)

(72) Inventors: Lei Wang, Danville, CA (US); Jih-Chiou Hser, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 190 days.

(21) Appl. No.: 13/872,807

(22) Filed: Apr. 29, 2013

Related U.S. Application Data (62) Division of application No. 13/053,466, filed on Mar. 22, 2011, now Pat. No. 8,456,961.

(51) Int. Cl.
*G11B 5/127* (2006.01)
*H04R 31/00* (2006.01)
*G11B 5/31* (2006.01)

(52) U.S. Cl.
CPC .................................... *G11B 5/3163* (2013.01)

(58) Field of Classification Search
USPC .............. 29/603.07, 603.11–603.16, 603.18; 369/13.01, 13.02, 13.13, 13.14, 13.35, 369/13.33; 360/121, 122, 245.3, 317, 324
See application file for complete search history.

(56) References Cited

U.S. PATENT DOCUMENTS

| | | | |
|---|---|---|---|
| 5,687,267 A | 11/1997 | Uchida | |
| 5,907,571 A | 5/1999 | Ogino et al. | |
| 6,016,290 A | 1/2000 | Chen et al. | |
| 6,018,441 A | 1/2000 | Wu et al. | |
| 6,025,978 A | 2/2000 | Hoshi et al. | |
| 6,025,988 A | 2/2000 | Yan | |
| 6,032,353 A | 3/2000 | Hiner et al. | |
| 6,033,532 A | 3/2000 | Minami | |
| 6,034,851 A | 3/2000 | Zarouri et al. | |
| 6,043,959 A | 3/2000 | Crue et al. | |
| 6,046,885 A | 4/2000 | Aimonetti et al. | |
| 6,049,650 A | 4/2000 | Jerman et al. | |
| 6,055,138 A | 4/2000 | Shi | |
| 6,058,094 A | 5/2000 | Davis et al. | |
| 6,073,338 A | 6/2000 | Liu et al. | |
| 6,078,479 A | 6/2000 | Nepela et al. | |
| 6,081,499 A | 6/2000 | Berger et al. | |

(Continued)

OTHER PUBLICATIONS

Office Action dated Sep. 11, 2012 from U.S. Appl. No. 13/053,466, 8 pages.

(Continued)

*Primary Examiner* — Paul D Kim (57) ABSTRACT

Systems and methods for mounting and aligning a laser in an electrically assisted magnetic recording (EAMR) assembly are described. In one embodiment, the invention relates to a submount assembly for a laser diode of an EAMR head, the submount assembly including a submount including a block shape including a first surface including a plurality of first conductive pads and a second surface including a second conductive pad, a laser including a main emitter and at least one alignment emitter, the laser having a block shape having a first surface including a plurality of first conductive pads attached to the first pads of the submount, and a slider including a top surface having a conductive pad configured to be attached to the second pad of the submount, wherein the at least one alignment emitter is configured to align the laser and the slider for attachment.

13 Claims, 6 Drawing Sheets

(56) References Cited

U.S. PATENT DOCUMENTS

| | | |
|---|---|---|
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,164,837 A | 12/2000 | Haake et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,485,198 B1 | 11/2002 | Chang et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,534,794 B1 | 3/2003 | Nakanishi et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,577,656 B2 | 6/2003 | Chen et al. |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |

(56) References Cited

U.S. PATENT DOCUMENTS

| | | |
|---|---|---|
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,858,871 B2 | 2/2005 | Okada |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,217,955 B2 | 5/2007 | Hamaoka et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,017 B1 | 5/2008 | Shi et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |

(56) References Cited

U.S. PATENT DOCUMENTS

| | | |
|---|---|---|
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,449,905 B2 | 11/2008 | Shi et al. |
| 7,493,688 B1 | 2/2009 | Wang et al. |
| 7,502,397 B2 | 3/2009 | Naganuma |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,522,649 B2 | 4/2009 | Ha et al. |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,608,863 B2 | 10/2009 | Oda et al. |
| 7,613,080 B2 | 11/2009 | Oozeki et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,739,703 B2 | 6/2010 | Arai et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,345,519 B1 * | 1/2013 | Pan .............................. 369/13.33 |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |

(56) References Cited

U.S. PATENT DOCUMENTS

| | | |
|---|---|---|
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,665,677 B1 * | 3/2014 | Panitchakan et al. ...... 369/13.17 |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 8,873,350 B2 * | 10/2014 | Rausch et al. ............. 369/13.33 |
| 8,908,480 B1 * | 12/2014 | Krichevsky ................ 369/13.13 |
| 2002/0089913 A1 | 7/2002 | Moriyama et al. |
| 2002/0163865 A1 | 11/2002 | Zimmer et al. |
| 2003/0002549 A1 | 1/2003 | Oh |
| 2007/0015313 A1 | 1/2007 | Kwak et al. |
| 2008/0056073 A1 | 3/2008 | Shimizu |
| 2008/0316872 A1 | 12/2008 | Shimizu et al. |
| 2010/0238581 A1 | 9/2010 | Nakamura et al. |
| 2010/0290157 A1 | 11/2010 | Zhang et al. |
| 2011/0086240 A1 | 4/2011 | Xiang et al. |
| 2011/0141862 A1 | 6/2011 | Arai et al. |
| 2011/0242697 A1 | 10/2011 | Mori et al. |
| 2012/0111826 A1 | 5/2012 | Chen et al. |
| 2012/0147717 A1 | 6/2012 | Shimazawa et al. |
| 2012/0163137 A1 | 6/2012 | Wang et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2013/0322822 A1 * | 12/2013 | Roeger et al. ................... 385/36 |

(56) References Cited

U.S. PATENT DOCUMENTS

2014/0029397 A1* 1/2014 Rausch et al. ............ 369/13.24
2014/0154529 A1 6/2014 Yang et al.
2014/0175050 A1 6/2014 Zhang et al.

OTHER PUBLICATIONS

Notice of Allowance dated Feb. 1, 2013 from U.S. Appl. No. 13/053,466, 9 pages.

* cited by examiner

METHODS FOR ASSEMBLING AN ELECTRICALLY ASSISTED MAGNETIC RECORDING (EAMR) HEAD

REFERENCE TO RELATED APPLICATIONS

This application is a divisional of U.S. patent application Ser. No. 13/053,466, filed Mar. 22, 2011, entitled "SYSTEMS AND METHODS FOR MOUNTING AND ALIGNING A LASER IN AN ELECTRICALLY ASSISTED MAGNETIC RECORDING ASSEMBLY", now U.S. Pat. No. 8,456,961, the entire content of which is incorporated herein by reference.

FIELD

The present invention relates to information storage devices, and more specifically to systems and methods for mounting and aligning a laser in an electrically assisted magnetic recording (EAMR) assembly.

BACKGROUND

Conventional electrically assisted magnetic recording (EAMR) disk drives generally include an EAMR assembly including a conventional laser diode (e.g., laser) mounted to a submount which is coupled to a slider that can be suspended over a recording media disk. The submount is helpful to dissipate excess thermal energy from the laser and to provide connectivity for electrical signals to the laser.

Light from the laser is directed by a transducer positioned within the slider to a region of the media disk thereby heating the region. The transducer can then magnetically write information to the media in the region that was heated. As precise control and delivery of the laser light to the media can be important, EAMR systems generally require accurate alignment of the laser and slider during the assembly process. However, the alignment and assembly of the components of the conventional EAMR systems can be complicated and challenging. Accordingly, what is needed is a system and method for improving the alignment and assembly processes associated with EAMR assemblies.

SUMMARY

Aspects of the invention relate to systems and methods for mounting and aligning a laser in an electrically assisted magnetic recording (EAMR) assembly. In one embodiment, the invention relates to a submount assembly for a laser diode of an EAMR head, the submount assembly including a submount including a block shape including a first surface including a plurality of first conductive pads and a second surface including a second conductive pad, a laser including a main emitter and at least one alignment emitter, the laser having a block shape having a first surface including a plurality of first conductive pads attached to the first pads of the submount, and a slider including a top surface having a conductive pad configured to be attached to the second pad of the submount, wherein the at least one alignment emitter is configured to align the laser and the slider for attachment.

In another embodiment, the invention relates to a method for assembling an energy assisted magnetic recording (EAMR) head, the method including attaching a plurality of first conductive pads on a first surface of a laser to a plurality of conductive pads on a submount, the laser including a main emitter and at least one alignment emitter, aligning the laser and a slider using the at least one alignment emitter, attaching a conductive pad on a top surface of the slider to one of the plurality of conductive pads on the submount, activating the main emitter to emit light directed by a main waveguide on the slider to a magnetic substrate positioned proximate to the slider. In one embodiment, the slider includes a magnetic head configured to read or write data on the magnetic substrate.

DETAILED DESCRIPTION

Referring now to the drawings, embodiments of systems and methods for mounting and aligning a laser in an electrically assisted magnetic recording (EAMR) assembly are illustrated. The laser includes both a main emitter for writing information to a magnetic media disk and at least one alignment emitter for aligning the laser with a slider before the laser is coupled with the slider. The laser is attached to a submount prior to alignment with and attachment to the slider. The submount includes a number of conductive pads configured to enable electrical connectivity to the laser and separate control of the main emitter and alignment emitter.

In several embodiments, the submount is picked up and retained using a gripper device configured to apply vacuum pressure to the submount. As the submount is retained by the vacuum pressure, electrodes on the gripper make conductive contact with pads on the submount that are coupled to the alignment emitter. In such case, the gripper can be used to apply a voltage to the alignment emitter and thereby facilitate alignment and attachment of the laser and slider. Once the laser and slider are properly aligned, the submount can be attached to the slider. In several embodiments, the submount is attached to the slider by soldering appropriate pad(s) on each component.

In one embodiment, a process for assembling the components of the EAMR assembly includes attaching pads of a laser, where the laser includes a main emitter and an alignment emitter, to corresponding pads of the submount, aligning the laser and a slider using the alignment emitter, attaching a pad of the submount to a pad on the slider, activating the main emitter to emit light to a magnetic media substrate proximate the slider.

In several embodiments, the lasers and submounts described herein enable separate control/energization of the main emitter and alignment emitters under various circumstances, including testing, assembly, and operation.

Figure 1:
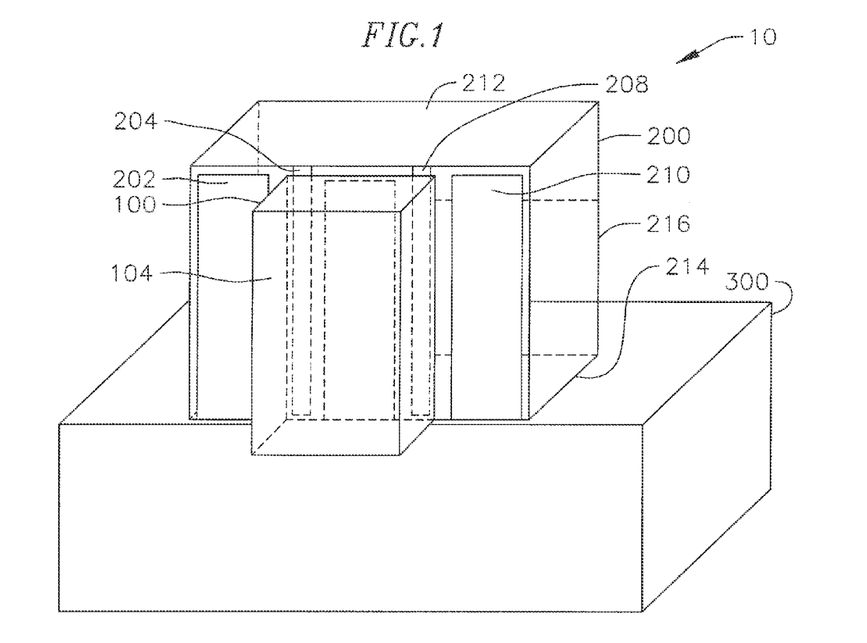
FIG. 1 is a perspective view of an electrically assisted magnetic recording (EAMR) assembly including a multi-emitter laser attached to a submount which is mounted on top of a slider in accordance with one embodiment of the invention.

FIG. 1 is a perspective view of an electrically assisted magnetic recording (EAMR) assembly 10 including a multi-emitter laser 100 attached to a submount 200 which is mounted on top of a slider 300 in accordance with one embodiment of the invention. The multi-emitter laser 100 has a rectangular block shape and includes a main laser diode 101 (not visible in FIG. 1 but see FIG. 7) positioned in a central section of the block shape and having a p-type electrode coupled to a center pad 102 on a rear side surface (not visible in FIG. 1 but see FIG. 3) of the laser block 100 and a n-type electrode coupled to a common pad 104 (e.g., common to both the main laser diode and alignment diodes) on a front side surface of the laser block 100.

The multi-emitter laser 100 also includes two alignment emitter diodes (103, 105) (not visible in FIG. 1 but see FIG. 7) positioned at outer sections of the rectangular block shape. The two alignment emitter diodes (103, 105) have p-type electrodes coupled to a first pad 106 and a second pad 108 on the rear side surface (not visible in FIG. 1 but see FIG. 3) of the laser block 100 and an n-type electrode coupled to the common pad 104 on the front side surface of the laser block 100. The main emitter 101 can be used to write information to a magnetic media disk and the alignment emitters (103, 105) can be used to align the laser 100 and the slider 300 before attaching the laser 100 and submount 200 to the slider 300.

The submount 200 has a rectangular block shape and includes five pads (202, 204, 206, 208, 210) positioned on a front side surface (pad 206 is not visible in FIG. 1 but see FIGS. 3 and 5) of the submount 200. Pads 204, 206, and 208 on the first side surface of the submount are configured to attach to, and are soldered to, corresponding pads 106, 102 and 108 of the laser 100. The submount 200 also includes a pad 212 on a top surface, a pad 214 on a bottom surface, and a pad 216 on a rear side surface (pads 214 and 216 are not visible in FIG. 1 but see FIGS. 3, 5, and 6). Top surface pad 212 is electrically connected to pad 204 and pad 208 of the front side surface of the submount 200. Bottom surface pad 214 is electrically connected to pad 202, pad 206, and pad 210 on the front side surface. Rear side surface pad 216 is electrically connected to bottom surface pad 214, and therefore also to pad 202, pad 206, and pad 210 on the front side surface. The pads of the submount 200 not attached to the laser 100 or slider 300 can be used during an alignment phase as described below.

The slider 300 includes a single pad 302 on a top surface (not visible in FIG. 1 but see FIG. 2) configured to attach to, and soldered to, pad 214 on the bottom surface of the submount 200. The slider 300 also includes a main waveguide 304 and two alignment waveguides (306, 308) (waveguides are not visible in FIG. 1 or 2 but see FIG. 7).

FIGS. 1-6 illustrate pad arrangements on both the laser 100 and submount 200 to support two alignment emitters. In other embodiments, the number of pads can be reduced to support a single alignment emitter, or increased to support more than two alignment emitters. In such case, the other components needed to support the numbers of alignment emitters can be adjusted accordingly. In several embodiments, the laser includes a single main emitter for writing information to the media disk. In other embodiments, the laser can include additional main emitters for writing information to one or more media disks.

In one embodiment, the laser 100 has a thickness (e.g., horizontal dimension along bottom edge in FIG. 2) of about 80 to 100 microns, a height (e.g., vertical dimension along side edge in FIG. 2) of about 200 to 1000 microns, and a width of about 200 microns. In other embodiments, the laser can have other suitable dimensions. In one embodiment, the laser provides about 60 milliwatts. In other embodiments, the laser can provide more than or less than 60 milliwatts.

In one embodiment, the submount 200 has a thickness (e.g., horizontal dimension along bottom edge in FIG. 2) of about 140 to 220 microns, a height (e.g., vertical dimension along side edge in FIG. 2) of about 250 to 1050 microns, and a width of about 400 to 700 microns. In other embodiments, the submount can have other suitable dimensions. In several embodiments, the height of the submount is made to be just greater than the height of the laser.

In one embodiment, the slider 300 has a thickness (e.g., vertical dimension along side edge in FIG. 2) of about 200 to 250 microns, a length (e.g., horizontal dimension along bottom edge in FIG. 2) of about 800 to 1300 microns, and a width of about 600 to 800 microns. In other embodiments, the slider can have other suitable dimensions.

Figure 2:
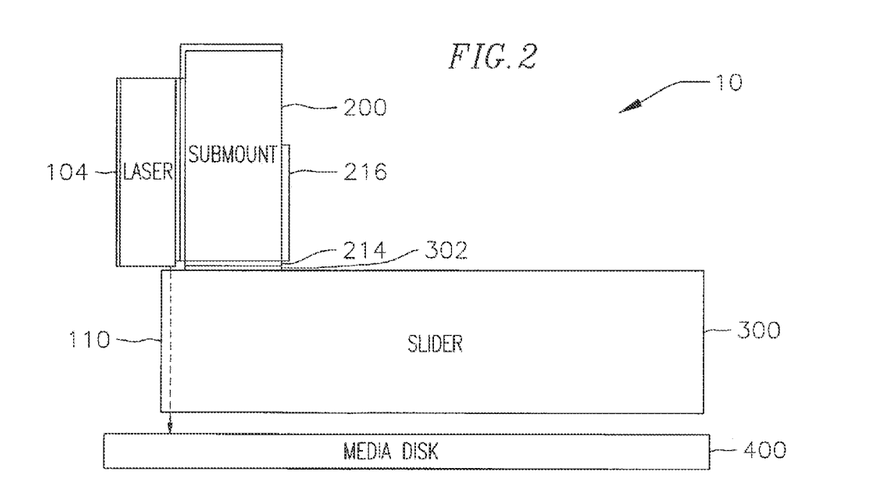
FIG. 2 is a side view of the electrically assisted magnetic recording (EAMR) assembly of FIG. 1 positioned over a media disk in accordance with one embodiment of the invention.

FIG. 2 is a side view of the electrically assisted magnetic recording (EAMR) assembly 10 of FIG. 1 positioned over a media disk 400 in accordance with one embodiment of the invention. In operation, the main emitter 101 (see FIG. 7) of the laser 100 can be activated to produce light beam 110 that extends through main waveguide 304 (see FIG. 7) of the slider 300 and on to the media disk 400. In one embodiment, the main emitter 101 is activated by applying a first voltage to pad 102 of the laser 100, via pad 302 of the slider 300, and a second voltage to pad 104 of the laser 100 by an external connection (not shown) thereto.

Figures 3, 4, 5, 6:
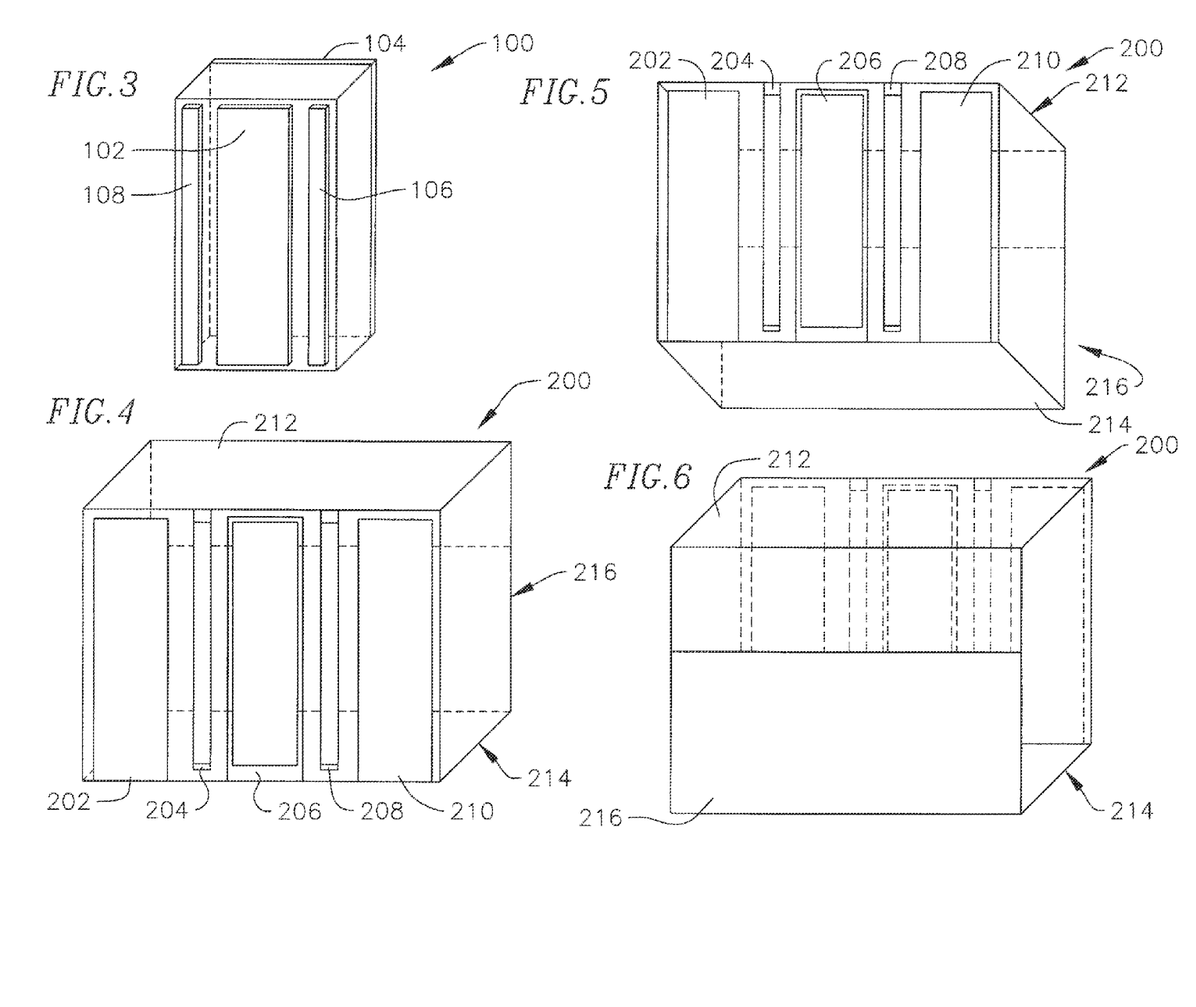
FIG. 3 is a rear perspective view of the multi-emitter laser of FIG. 1 illustrating the arrangement of pads on a back side surface in accordance with one embodiment of the invention.
FIG. 4 is a top perspective view of the submount of FIG. 1 illustrating the arrangement of pads on a front side surface and top surface in accordance with one embodiment of the invention.
FIG. 5 is a bottom perspective view of the submount of FIG. 1 illustrating the arrangement of pads on the front side surface and a bottom surface in accordance with one embodiment of the invention.
FIG. 6 is a rear perspective view of the submount of FIG. 1 illustrating the arrangement of pads on a back side surface and the top surface in accordance with one embodiment of the invention.

FIG. 3 is a rear perspective view of the multi-emitter laser 100 of FIG. 1 illustrating the arrangement of pads on a back side surface (102, 106, 108) in accordance with one embodiment of the invention. Pad 104 of the laser is positioned on the front side surface.

FIG. 4 is a top perspective view of the submount 200 of FIG. 1 illustrating the arrangement of pads on a front side surface (202, 204, 206, 208, 210) and top surface (212) in accordance with one embodiment of the invention.

FIG. 5 is a bottom perspective view of the submount 200 of FIG. 1 illustrating the arrangement of pads on the front side surface (202, 204, 206, 208, 210) and a bottom surface (214) in accordance with one embodiment of the invention.

FIG. 6 is a rear perspective view of the submount 200 of FIG. 1 illustrating the arrangement of pads on a back side surface (216) and the top surface (212) in accordance with one embodiment of the invention.

Figure 7:
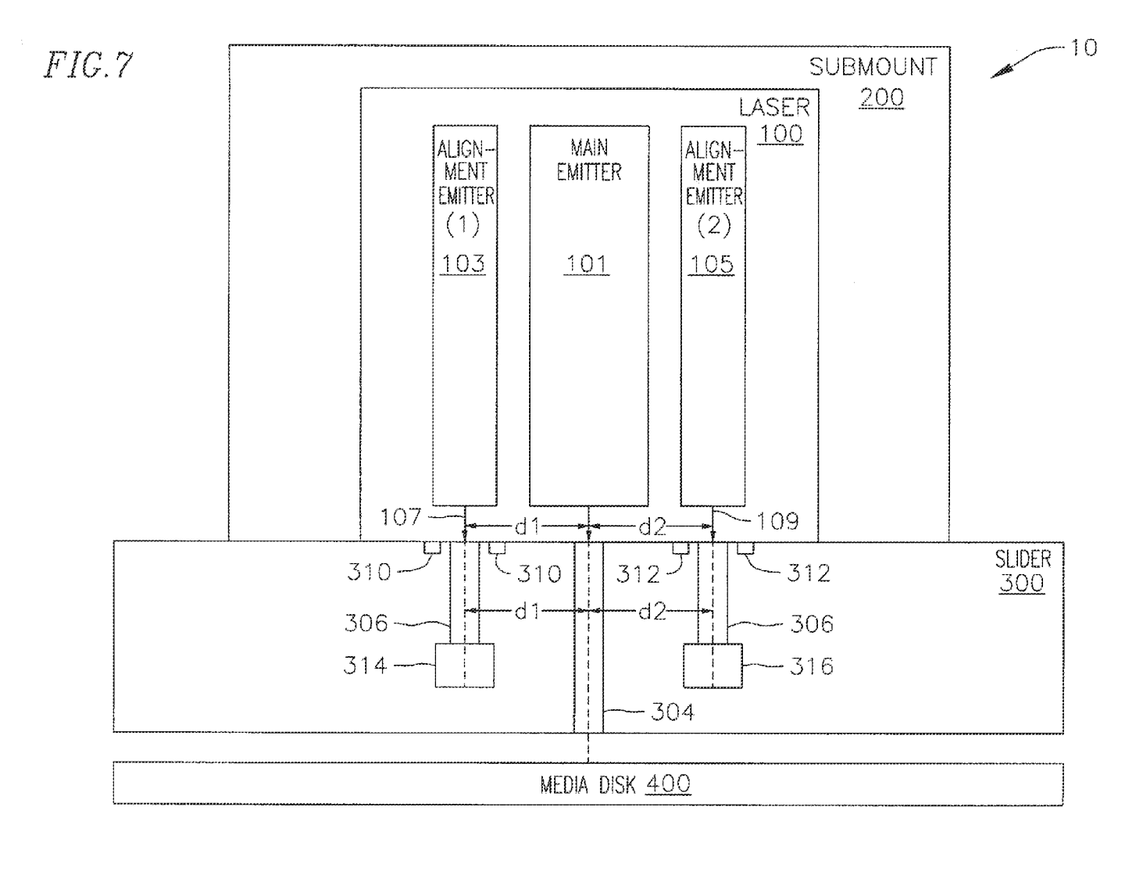
FIG. 7 is a cross sectional block diagram of the EAMR assembly and the media disk of FIG. 2 taken along the line of the laser beam extending through the slider, illustrating the arrangement of a main emitter, a first alignment emitter, and a second alignment emitter of the laser and a main waveguide, a first alignment waveguide, and a second alignment waveguide of the slider in accordance with one embodiment of the invention.

FIG. 7 is a cross sectional block diagram of the EAMR assembly 10 and the media disk 400 of FIG. 2 taken along the line of the laser beam 110 extending through the slider 300, illustrating the arrangement of a main emitter 101, a first alignment emitter 103, and a second alignment emitter 105 of the laser 100 and a main waveguide 304, a first alignment waveguide 306, and a second alignment waveguide 308 of the slider 300 in accordance with one embodiment of the invention.

The slider 300 includes first fiducial marks 310 and second fiducial marks 312 for passive alignment that can precede active alignment using the alignment emitters (103, 105). The slider 300 also includes a first output device 314 positioned at an end of the first waveguide 306, and a second output device 316 positioned at an end of the second waveguide 308. The output devices (314, 316) can be used to measure and maximize a quantity of light received from the alignment emitters (103, 105) during an alignment process. The alignment emitters (103, 105) are spaced apart from the main emitter 101 by distances d1 and d2, respectively. Similarly, waveguides (306, 308) are spaced apart from the main waveguide 304 by the distances d1 and d2, respectively. The precise spacing in both the laser emitters and submount waveguides can contribute to proper and accurate alignment.

In operation, the submount 200 and attached laser 100 are initially separated from the slider 300 by some distance. Passive alignment of the laser 100 and slider 300 can be accomplished by roughly aligning the alignment emitters (103, 105) and the fiducial marks (310, 312) of the slider. The alignment emitters (103, 105) can be activated. Thus, the first alignment emitter 103 can emit a light beam 107 and first alignment emitter 103 can thus emit a light beam 109. Light beam 107 can be received by first waveguide 306 and the first output device 314. Similarly, light beam 109 can be received by second waveguide 308 and the first output device 316. Output devices (314, 316) can measure and maximize the received light for accurate alignment of the laser 100 and slider 300. Additional details regarding the alignment and assembly processes are described below.

Figure 8:
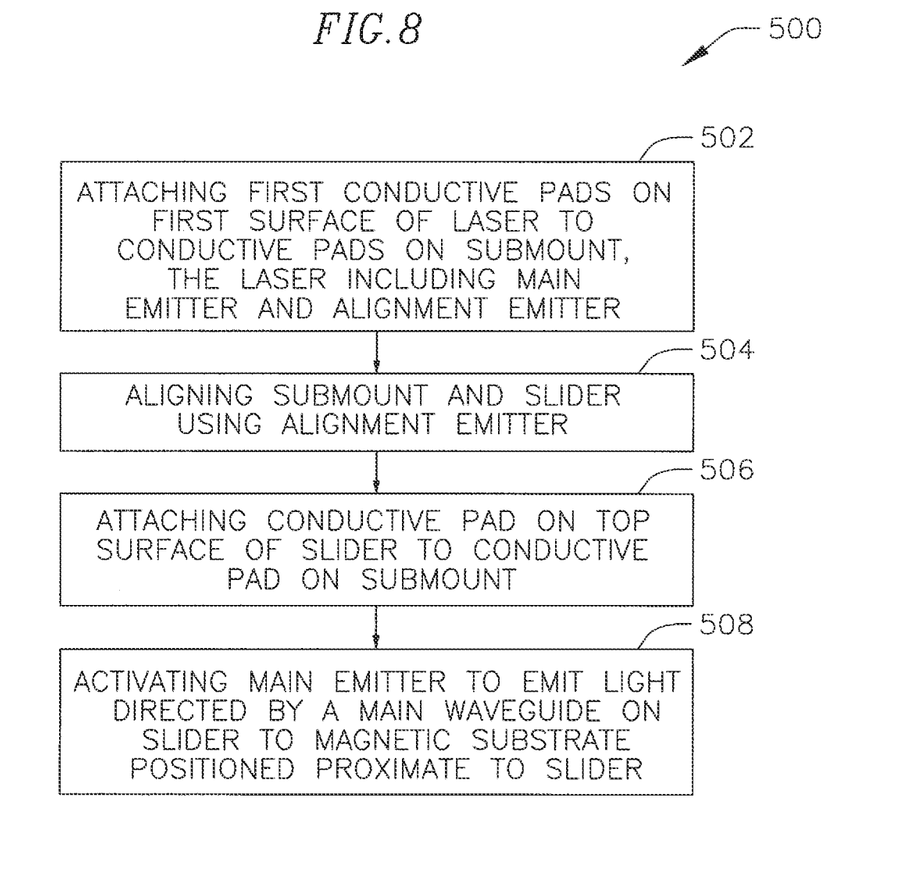
FIG. 8 is a flow chart of a process for assembling an EAMR assembly including a multi-emitter laser, a submount, and a slider in accordance with one embodiment of the invention.

FIG. 8 is a flow chart of a process 500 for assembling an EAMR assembly including a multi-emitter laser, a submount, and a slider in accordance with one embodiment of the invention. The process first attaches (502) first conductive pads on a first surface of the laser to conductive pads on the submount. In several embodiments, three pads on the first surface of the laser are attached to three corresponding pads on a surface of the submount by soldering the pads together. In other embodiments, more than or less than three pads on the first surface of the laser are attached to corresponding pads on a surface of the submount. In some embodiments, a flip chip bonder and a camera are used to facilitate the alignment and soldering of the pads of the laser and submount. In one embodiment, the flip chip bonder is a model FC300 made by SET or Smart Equipment Technology of Saint Jeoire, France. In some embodiments, a jumper wire, or another suitable connector, is soldered to a pad on the laser and a pad on the submount to facilitate operation of the alignment emitters and non-operation of the main emitter. In such case, the arrangement of pads on the submount and laser can enable independent control of the main emitter and alignment emitters.

The process then aligns (504) the submount and the slider using one or more alignment emitters. In several embodiments, the submount is picked up and retained using a gripper device configured to apply vacuum pressure to the submount. As the submount is retained, voltage can be applied to electrodes on the gripper having made conductive contact with pads on the submount. As such, the electrodes are effectively coupled to the one or more alignment emitters. Alignment waveguides and output devices/optical detectors on the slider help to determine when the laser/submount assembly is properly aligned with the slider.

The process then attaches (506) a conductive pad on the top surface (e.g., pad 302 in FIG. 2) of the slider to a corresponding conductive pad (e.g., pad 214 in FIG. 2). In several embodiments, the attachment is achieved by soldering. In embodiments having installed the jumper wire, the jumper wire can be removed or otherwise disconnected following the attachment. The process then activates (508) the main emitter to emit light directed by the main waveguide on the slider to a magnetic substrate (e.g., magnetic media disk) positioned proximate to the slider (e.g., beneath the slider). In several embodiments, the bottom surface of the slider is an air bearing surface (ABS) and the magnetic substrate is positioned just below the ABS. In a number of embodiments, the main emitter is activated by application of a voltage across the appropriate pads of the laser and submount that are coupled to the terminals of the main emitter.

In one embodiment, the process can perform the sequence of actions in a different order. In another embodiment, the process can skip one or more of the actions. In other embodiments, one or more of the actions are performed simultaneously. In some embodiments, additional actions can be performed.

A similar alignment process in described in U.S. patent application Ser. No. 12/976,770, filed Dec. 22, 2010, entitled, "METHOD AND SYSTEM FOR OPTICALLY COUPLING A LASER WITH A TRANSDUCER IN AN ENERGY ASSISTED MAGNETIC RECORDING DISK DRIVE", the entire content of which is incorporated herein by reference.

FIGS. 9a-9e illustrate multiple perspective and side views of an EAMR assembly, including a multi-emitter laser 100, a submount 200, and a slider 300, in a process for assembling the EAMR assembly in accordance with one embodiment of the invention.

Figures 9A, 9B, 9C, 9D, 9E:
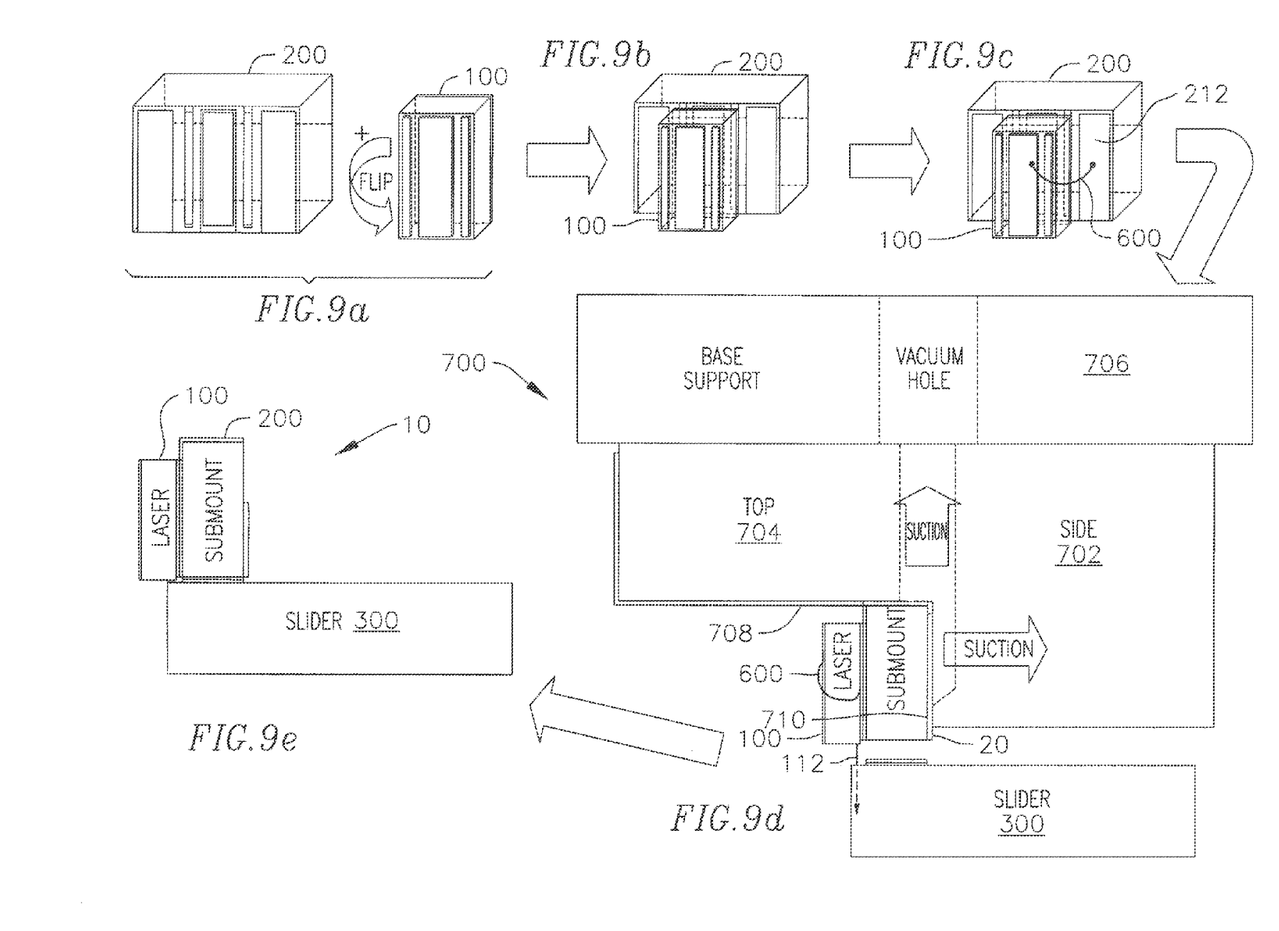
FIGS. 9a-9e illustrate multiple perspective and side views of an EAMR assembly, including a multi-emitter laser, a submount, and a slider, in a process for assembling the EAMR assembly in accordance with one embodiment of the invention.

FIG. 9a is a perspective view of the laser 100 and submount 200 prior to attachment in accordance with one embodiment of the invention.

FIG. 9b is a perspective view of the laser 100 and submount 200 after attachment in accordance with one embodiment of the invention. In one embodiment, the attached laser 100 and submount 200 can be referred to as a chip on a submount assembly or COSA.

FIG. 9c is a perspective view of the attached laser 100 and submount 200 after a jumper wire 600 has been attached to pad 104 on the front side surface of the laser 100 and pad 210 of the front side surface of the submount 200 in accordance with one embodiment of the invention. In another embodiment, the jumper wire 600 can be attached to pad 202 rather than pad 210. In one embodiment, the jumper wire is replaced by another suitable connector. In another embodiment, other suitable arrangements of pads and jumpers can be used to facilitate separate control of the alignment emitters during the alignment and assembly processes.

FIG. 9d is a side view of a gripper assembly 700 retaining the submount 200 and the laser 100 above a slider 300 using vacuum pressure and applying an alignment voltage to the alignment emitters of the laser 100 in accordance with one embodiment of the invention. The gripper assembly 700 includes a side section 702 and a top section 704 for contacting and applying the vacuum pressure to sides of the submount 200 in two directions. The gripper assembly 700 can be thought of as being a silicon gripper and having an L-shaped body. The contacting surfaces of the side section 702 and the top section 704 each have openings (e.g., holes) at which the vacuum pressure is applied via a base support 706 positioned above the two sections. The contacting surface of the top section 704 also includes a positive electrode 708 for applying a voltage to the positive or p-type electrodes of the alignment emitters of the laser 100. The contacting surface of the side section 702 also includes a negative electrode 710 for applying a voltage to the negative or n-type electrode of the alignment emitters of the laser 100.

In operation, the gripper assembly 700 is positioned near the submount 200 and the vacuum pressure applied. Due to the force of the vacuum pressure and/or movement of the gripper assembly 700 or the submount 200, the submount 200 is positioned against the contacting walls and corresponding electrodes (708, 710) of the side section 702 and top section 704. Once the electrodes (708, 710) have made contact with corresponding pads of the submount 200, which are coupled to terminals of the alignment emitters, and appropriate voltages applied thereto, the alignment emitters are activated and emit light 112 into the slider 300. Using alignment waveguides and output detectors/devices in the slider 300 (see FIG. 7), correct alignment of the laser 100 and slider 300 can be achieved by ensuring that a preselected amount of light is received at each of the alignment waveguides. Once the correct alignment is achieved, the positions of the slider 300 and submount 200 can be substantially fixed in all directions except in the vertical or "z" direction. Solder can be placed on either the bottom pad of the submount 200 or on the pad on the top surface of the slider 300. The submount 200 and/or slider 300 can be brought together as the pads are heated for a proper solder junction. Once attachment of the submount 200 and slider 300 is complete, the jumper wire 600 can be removed.

FIG. 9e is a side view of the completed electrically assisted magnetic recording (EAMR) assembly 10 in accordance with one embodiment of the invention. In several embodiments, a voltage is applied to the main emitter of the laser 100 by applying a positive terminal voltage to the pad on the slider 300 and a negative terminal voltage to the pad 104 of the laser.

In one embodiment, the process can perform the sequence of actions illustrated in FIGS. 9a-9e in a different order. In another embodiment, the process can skip one or more of the actions. In other embodiments, one or more of the actions are performed simultaneously. In some embodiments, additional actions can be performed.

In one embodiment, the submount 200 is made of aluminum nitride or another suitable material. In one embodiment, the conductive pads are made of titanium, platinum and/or gold. In other embodiments, the conductive pads are made of other suitable conductive materials. In one embodiment, the solder is made of a gold tin alloy. In other embodiments, the solder is made of other suitable materials.

In one embodiment, the laser 100 is made of gallium arsenide and/or other suitable materials such as aluminum or indium. In one embodiment, the gripper 700 is made of silicon. In other embodiments, the gripper 700 is made of other materials having suitable thermal expansion properties. In one embodiment, the gripper 700 is made of tungsten carbide, copper, steel, and/or other suitable materials.

Figure 10:
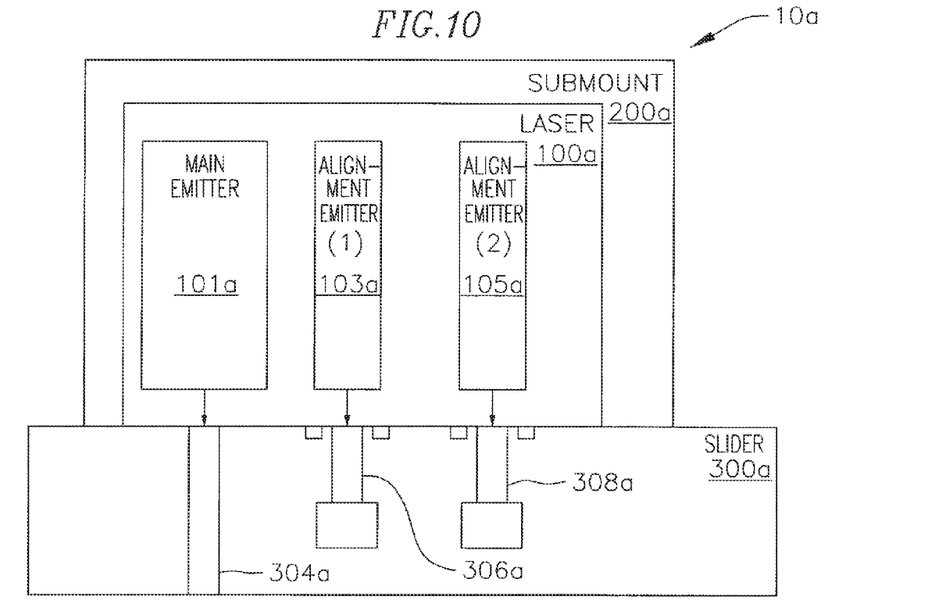
FIG. 10 is a cross sectional block diagram of an EAMR assembly illustrating an alternative arrangement of a main emitter, a first alignment emitter, and a second alignment emitter of the laser and a main waveguide, a first alignment waveguide, and a second alignment waveguide of the slider in accordance with one embodiment of the invention.

FIG. 10 is a cross sectional block diagram of an EAMR assembly 10a illustrating an alternative arrangement of a main emitter 101a, a first alignment emitter 103a, and a second alignment emitter 105a of the laser 100a and a main waveguide 304a, a first alignment waveguide 306a, and a second alignment waveguide 308a of the slider 300a in accordance with one embodiment of the invention. In this arrangement, the alignment emitters (103a, 105a) of the laser 100a are both positioned along the same side section of the laser 100a rather than on opposite sides of the main emitter (see e.g., FIG. 7). Similar to the embodiment of FIG. 7, laser 100a is attached to submount 200a which is mounted to slider 300a.

Figure 11:
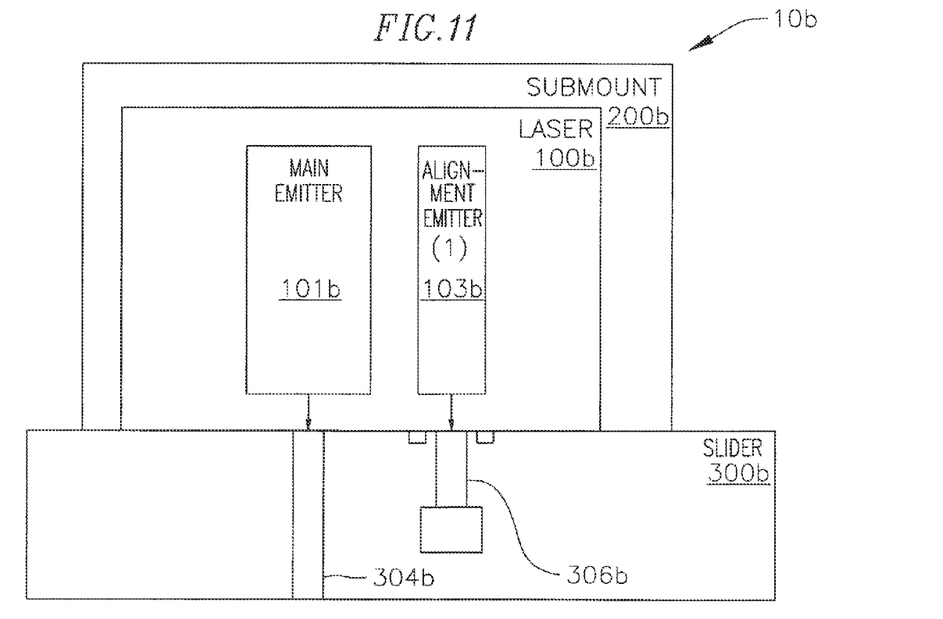
FIG. 11 is a cross sectional block diagram of an EAMR assembly illustrating another alternative arrangement of a main emitter and a single alignment emitter of the laser and a main waveguide and a single alignment waveguide of the slider in accordance with one embodiment of the invention.

FIG. 11 is a cross sectional block diagram of an EAMR assembly 10b illustrating another alternative arrangement of a main emitter 101b and a single alignment emitter 103b of the laser 100b and a main waveguide 304b and a single alignment waveguide 306b of the slider 300b in accordance with one embodiment of the invention. In this arrangement, a single alignment emitter 103b of the laser 100b is positioned to one side of the laser 100b, opposite of the main emitter 101b, rather than having two alignment emitters where each is positioned on opposite sides of the main emitter (see e.g., FIG. 7). Similar to the embodiment of FIG. 7, laser 100b is attached to submount 200b which is mounted to slider 300b.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A method for assembling an energy assisted magnetic recording (EAMR) head, the method comprising:
   attaching a plurality of first conductive pads on a first surface of a laser to a plurality of conductive pads on a submount, the laser comprising a main emitter and at least one alignment emitter;
   aligning the laser and a slider using the at least one alignment emitter;
   attaching a conductive pad on a top surface of the slider to one of the plurality of conductive pads on the submount; and
   activating the main emitter to emit light directed by a main waveguide on the slider to a magnetic substrate positioned proximate to the slider.

2. The method of claim 1, wherein the aligning the laser and the slider using the at least one alignment emitter comprises:
   activating the at least one alignment emitter to emit light; and
   receiving and measuring the light from the at least one alignment emitter at an alignment waveguide on the slider.

3. The method of claim 2,
   wherein the alignment waveguide and the main waveguide are spaced apart by a preselected distance, and
   wherein the main emitter and the at least one alignment emitter are spaced apart by the preselected distance.

4. The method of claim 1, wherein the slider comprises a magnetic head configured to read or write data on the magnetic substrate.

5. The method of claim 1, wherein the laser comprises two alignment emitters.

6. The method of claim 5:
wherein the plurality of conductive pads on the submount comprises four first conductive pads on a first surface of the submount,
wherein a primary two of the four first conductive pads on the first surface of the submount are electrically coupled to a second conductive pad on a second surface of the submount,
wherein the submount further comprises a third conductive pad on a third surface of the submount opposite to the second surface,
wherein a secondary two of the four first conductive pads on the first surface of the submount are electrically coupled to the third conductive pad on the third surface of the submount, and
wherein the submount further comprises a fourth conductive pad on a fourth surface of the submount opposite to the first surface, the fourth conductive pad electrically coupled to the second conductive pad on the second surface of the submount.

7. The method of claim 6:
wherein the attaching the plurality of first conductive pads on the first surface of the laser to the plurality of conductive pads on the submount comprises attaching three first conductive pads on the first surface of the laser to three of the four first conductive pads on the first surface of the submount, and
wherein the laser further comprises a second conductive pad on a second surface of the laser opposite to the first surface of the laser.

8. The method of claim 7, wherein the attaching the plurality of first conductive pads on the first surface of the laser to the plurality of conductive pads on the submount further comprises applying a vacuum pressure to the submount using a gripper to retain the submount along the gripper;
the gripper comprising:
a first gripper surface including a first electrode configured to make electrical contact with the third pad on the third surface of the submount;
a second gripper surface including a second electrode configured to make electrical contact with the fourth pad on the fourth surface of the submount; and
a hole along either or both of the first gripper surface and the second gripper surface,
wherein the gripper is configured to apply the vacuum pressure via the hole for retaining the submount in conductive contact with the first gripper surface and the second gripper surface during an alignment and attachment phase, and
wherein the gripper is configured to apply a first voltage at the first electrode and a second voltage at the second electrode to activate the alignment emitters.

9. The method of claim 8, wherein the aligning the laser and the slider using the at least one alignment emitter comprises attaching a jumper wire to the second conductive pad on the second surface of the laser and to the one of the four first conductive pads on the first surface of the submount not attached to the laser.

10. The method of claim 9, wherein the attaching the conductive pad on the top surface of the slider to the one of the plurality of conductive pads on the submount further comprises disconnecting the jumper wire.

11. The method of claim 1, wherein the attaching the plurality of first conductive pads on the first surface of the laser to the plurality of conductive pads on the submount comprises:
heating a solder on the conductive pads on the submount or a solder on the first conductive pads of the laser; and
aligning and bonding the pads of the laser and the pads of the submount.

12. The method of claim 1, wherein the aligning the submount and the slider using the at least one alignment emitter comprises:
attaching a jumper wire to a second conductive pad on a second surface of the laser to one of the conductive pads on the submount;
applying a vacuum pressure to the submount using a gripper to retain the submount along the gripper thereby coupling a first electrode of the gripper with one of the conductive pads on the submount and coupling a second electrode of the gripper with another of the conductive pads on the submount;
applying a first voltage to the first electrode and a second voltage to the second electrode thereby activating the at least one alignment emitter;
receiving and measuring, at an alignment waveguide on the slider, light generated by the at least one alignment emitter; and
repositioning either or both of the submount and the slider based on the received light.

13. The method of claim 1, wherein the attaching the conductive pad on the top surface of the slider to the one of the plurality of conductive pads on the submount further comprises:
heating a solder on the conductive pad on the top surface of the slider or a solder on one of the conductive pads on the submount; and
aligning and bonding the one of the conductive pads of the submount and the pad of the slider.

* * * * *